(12) United States Patent
Kawai

(10) Patent No.: US 9,529,761 B2
(45) Date of Patent: Dec. 27, 2016

(54) DATA TRANSFER APPARATUS, HOST APPARATUS, DATA TRANSFER SYSTEM, AND COMMUNICATION MODE SETTING METHOD

(71) Applicant: Panasonic Corporation, Osaka (JP)

(72) Inventor: Yoshinao Kawai, Kanagawa (JP)

(73) Assignee: Panasonic Corporation, Osaka (JP)

( * ) Notice: Subject to any disclaimer, the term of this patent is extended or adjusted under 35 U.S.C. 154(b) by 59 days.

(21) Appl. No.: 14/626,866

(22) Filed: Feb. 19, 2015

(65) Prior Publication Data

US 2015/0242353 A1 Aug. 27, 2015

(30) Foreign Application Priority Data

Feb. 26, 2014 (JP) ................................. 2014-035329

(51) Int. Cl.
*G06F 13/40* (2006.01)
*G06F 13/38* (2006.01)
*G06F 13/10* (2006.01)

(52) U.S. Cl.
CPC ........... *G06F 13/4068* (2013.01); *G06F 13/10* (2013.01); *G06F 13/385* (2013.01); *Y02B 60/1228* (2013.01); *Y02B 60/1235* (2013.01)

(58) Field of Classification Search
CPC .... G06F 13/4068; G06F 13/385; G06F 13/10; Y02B 60/1228; Y02B 60/1235
See application file for complete search history.

(56) References Cited

U.S. PATENT DOCUMENTS

| | | | |
|---|---|---|---|
| 7,774,424 B1* | 8/2010 | Bailey ................... | G06F 13/385 709/211 |
| 2007/0008898 A1* | 1/2007 | Sharma ............... | G06F 13/4278 370/252 |
| 2010/0169523 A1* | 7/2010 | Dunstan ................ | G06F 13/385 710/104 |
| 2013/0013842 A1* | 1/2013 | Numamoto ............. | G06F 13/00 710/316 |
| 2014/0012961 A1* | 1/2014 | Pope ....................... | H04L 69/14 709/220 |
| 2014/0269543 A1* | 9/2014 | Li ......................... | H04W 28/18 370/329 |

FOREIGN PATENT DOCUMENTS

| | | |
|---|---|---|
| JP | 2008-009659 | 1/2008 |
| JP | 2012-063817 | 3/2012 |

* cited by examiner

*Primary Examiner* — Idriss N Alrobaye
*Assistant Examiner* — Ronald Modo
(74) *Attorney, Agent, or Firm* — Seed IP Law Group LLP

(57) ABSTRACT

A device apparatus carries out data transfer between a host-side device communication unit that supports a plurality of host-side communication modes and that communicates with a host apparatus and a device communication unit that supports a plurality of network-side communication modes respectively matching communication speeds of the plurality of host-side communication modes and that communicates with a communication device and switches a host-side communication mode that is used by the host-side device communication unit, in response to switching of a network-side communication mode that is used by the device communication unit.

13 Claims, 12 Drawing Sheets

DATA TRANSFER APPARATUS, HOST APPARATUS, DATA TRANSFER SYSTEM, AND COMMUNICATION MODE SETTING METHOD

CROSS REFERENCES TO RELATED APPLICATIONS

This application claims priority to Japanese Patent Application No. 2014-035329, filed on Feb. 26, 2014, the contents of which are hereby incorporated by reference.

BACKGROUND

1. Technical Field

The present disclosure relates to a data transfer apparatus, a data transfer system, a communication mode setting method in the data transfer apparatus, and a host apparatus that makes use of the data transfer apparatus.

2. Description of the Related Art

Conventionally, there have been apparatuses that transfer data between host apparatuses such as personal computers and communication devices such as peripheral devices of the personal computers (hereinafter referred to as "data transfer apparatuses").

Peripheral devices of personal computers have transfer rates that greatly differ depending on types, applications, and the like. For instance, mice have low transfer rates, while printers have high transfer rates. Thus a technique exists in which transfer rates of peripheral devices are acquired from the peripheral devices and in which a communication mode to be used between a host apparatus and the peripheral devices is determined based on the acquired transfer rates (refer to Japanese Unexamined Patent Application Publication No. 2012-063817, for instance).

A data transfer apparatus disclosed in Japanese Unexamined Patent Application Publication No. 2012-063817 (hereinafter referred to as "prior art") is a universal serial bus (USB) hub that supports USB 3.0. The prior art is connected to the host apparatus and to an external memory card controller, for instance, and transfers data between these apparatuses.

When a memory card of a type with high transfer rate is inserted into the external memory card controller, the prior art receives device information indicating the high transfer rate from the external memory card controller and determines use of USB 3.0 with high data transfer rate. When a memory card of a type with low transfer rate is inserted into the external memory card controller, the prior art receives device information indicating the low transfer rate from the external memory card controller and determines use of USB 2.0 with low data transfer rate.

Such a prior art prevents occurrence of situations such as communication at unnecessarily high speed in spite of low transfer rates of peripheral devices and reduces power consumption resulting from data transfer via a USB hub.

SUMMARY

With pervasion of portable terminals such as smart phones, in recent years, demand for data transfer apparatuses with which a portable terminal may be used as a host apparatus has been growing. For such data transfer apparatuses for portable terminal, reduction in power consumption is further demanded. Peers (hereinafter referred to as "host peers") with which host apparatuses communicate via data transfer apparatuses have become so diversified as to include servers on the Internet or the like. Therefore, data transfer apparatuses that may be applied to various applications other than USB hub and by which power consumption may be reduced are demanded.

Thus, one non-limiting and exemplary embodiment provides a data transfer apparatus, a data transfer system, a communication mode setting method, and a host apparatus that makes use of the data transfer apparatus by which power consumption resulting from data transfer may be reduced in a broader range of application.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

In one general aspect, the techniques disclosed here feature a data transfer apparatus including a host-side device communication unit that supports a plurality of host-side communication modes including a first host-side communication mode and a second host-side communication mode and that communicates with a host apparatus, a device communication unit that supports a plurality of network-side communication modes including a first network-side communication mode and a second network-side communication mode, the plurality of network-side communication modes respectively matching communication speeds of the plurality of host-side communication modes and that communicates with a communication device, a data transfer unit that carries out data transfer between the host-side device communication unit and the device communication unit, and a device communication switching unit that switches the first host-side communication mode to the second host-side communication mode, in response to switching of the first network-side communication mode to the second network-side communication mode.

In another general aspect, the techniques disclosed here feature a host apparatus that communicated with the data transfer apparatus, the host apparatus including a host communication unit that supports the first host-side communication mode and the second host-side communication mode and that communicates with the host-side device communication unit and a host information storage unit that stores negotiation information for the second host-side communication mode which is acquired by the host communication unit, in which the host communication unit carries out negotiation for the second host-side communication mode before starting the communication in the first host-side communication mode and uses the negotiation information stored in the host information storage unit without carrying out the negotiation for the second host-side communication mode when the first host-side communication mode is switched to the second host-side communication mode.

These general and specific aspects may be implemented using a system, a method, and a computer program, and any combination of systems, methods, and computer programs.

According to the disclosure, power consumption resulting from data transfer may be reduced in a broader range of application.

DETAILED DESCRIPTION

Hereinbelow, embodiments of the disclosure will be described in detail with reference to the drawings.

Embodiment 1

Embodiment 1 is an example of a specific aspect in which a data transfer apparatus of the disclosure is applied to a device apparatus including a USB 3.0 host interface.
<Hardware Configuration>

Figure 1:
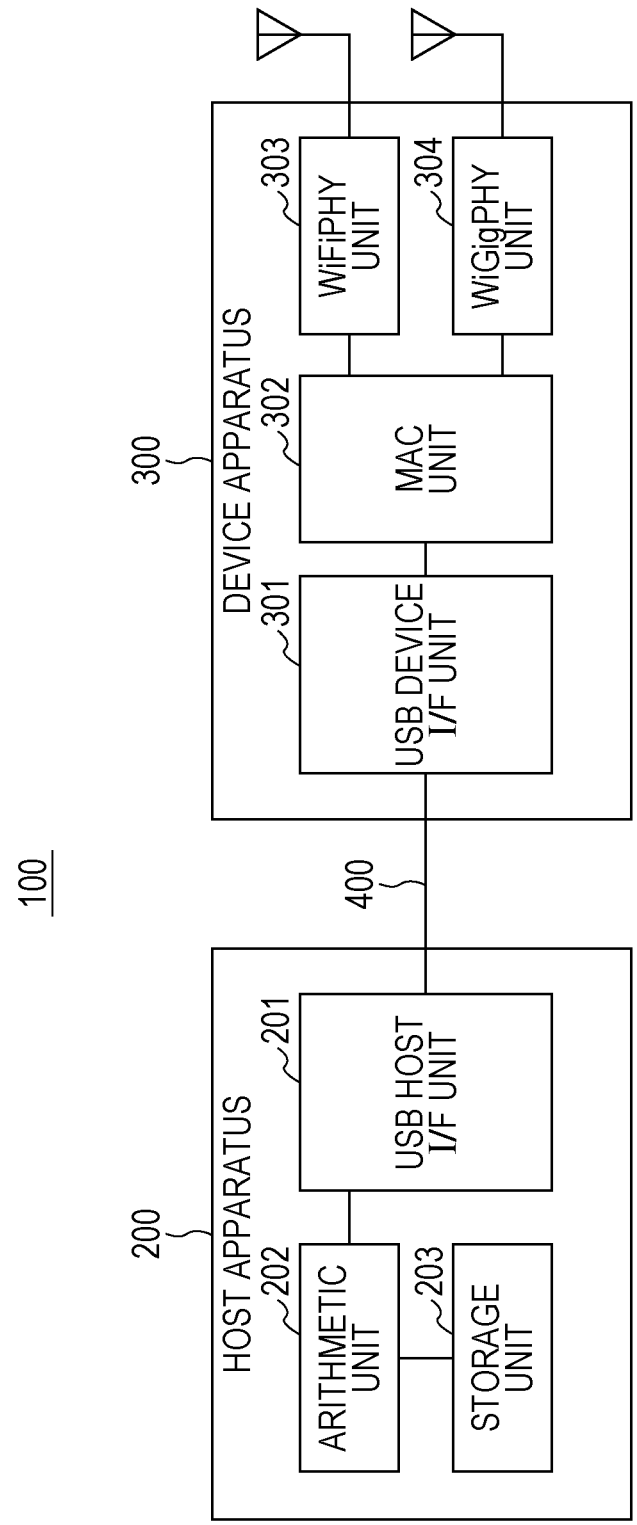
FIG. 1 illustrates an example of a hardware configuration of a data transfer system according to embodiment 1 of the disclosure.

FIG. 1 illustrates an example of a hardware configuration of a data transfer system according to the embodiment.

In FIG. 1, the data transfer system 100 includes a host apparatus 200, a device apparatus 300, and a cable 400.

The host apparatus 200 communicates with a host peer, not illustrated, via the device apparatus 300. Data that is to be transmitted between the host apparatus 200 and the host peer will be referred to as "communication data", hereinbelow. The host apparatus 200 includes a USB host I/F unit 201, an arithmetic unit 202, and a storage unit 203. The USB host I/F unit 201 and the storage unit 203 are connected to the arithmetic unit 202.

The USB host I/F unit 201 includes a USB 3.0 host controller and sockets and carries out operations of a USB host. More specifically, the USB host I/F unit 201 extracts communication data from packets received from the device apparatus 300, outputs the communication data to the arithmetic unit 202. The USB host I/F unit 201 also stores into packets the communication data inputted from the arithmetic unit 202, and transmits the packets to the device apparatus 300.

USB 3.0 that is mentioned as a high-speed serial transfer technology is made compatible with USB 2.0. Therefore, the USB host I/F unit 201 may be operated as a USB 2.0 host interface. Data transfer rate of USB 3.0 is 5 Gbps and data transfer rate of USB 2.0 is 480 Mbps.

The arithmetic unit 202 is an arithmetic processing unit such as a central processing unit (CPU). The arithmetic unit 202 has functions of upper layers such as application layer and carries out processing on communication data. The arithmetic unit 202 further carries out processing for reuse of negotiation information for USB, which will be described later.

The storage unit 203 is an information recording medium such as a flash memory. The storage unit 203 stores the negotiation information for USB, as will be described later.

The device apparatus 300 is an apparatus that includes the data transfer apparatus of the disclosure and that transfers communication data between the host apparatus 200 and the host peer. The device apparatus 300 includes a USB device interface (I/F) unit 301, an MAC unit 302, a WiFiPHY unit 303, and a WiGigPHY unit 304. The USB device I/F unit 301, the WiFiPHY unit 303, and the WiGigPHY unit 304 are connected to the MAC unit 302.

The USB device I/F unit 301 includes a device controller for USB 3.0 and sockets, and carries out operations of a USB device. The USB device I/F unit 301 communicates with the USB host I/F unit 201 of the host apparatus 200 through the cable 400. That is, the USB device I/F unit 301 is a USB 3.0 host interface. More specifically, the USB device I/F unit 301 extracts communication data from packets received from the host apparatus 200, outputs the communication data to the MAC unit 302. The USB device I/F unit 301 also stores into packets the communication data inputted from the MAC unit 302, and transmits the packets to the host apparatus 200.

The WiFiPHY unit 303 includes physical layer (PHY) chips and an antenna that are of wireless fidelity (WiFi) and carries out processing in physical layer of transmission data and reception data in WiFi communication. More specifically, the WiFiPHY unit 303 carries out A/D conversion processing and specified demodulation processing for received analog signals and outputs reception frames to the MAC unit 302. The WiFiPHY unit 303 carries out specified modulation processing and D/A conversion processing for transmission frames inputted from the MAC unit 302 and transmits the transmission frames by radio. The WiFiPHY unit 303 communicates by radio with other WiFi terminals (not illustrated) including the host peer placed in a communication network.

The WiGigPHY unit 304 includes PHY chips and an antenna that are of wireless gigabit (WiGig) and carries out processing in physical layer of transmission data and reception data in WiGig communication. More specifically, the WiGigPHY unit 304 carries out A/D conversion processing and specified demodulation processing for reception signals and outputs reception frames to the MAC unit 302. The WiGigPHY unit 304 carries out specified modulation processing and D/A conversion processing for transmission frames inputted from the MAC unit 302 and transmits analog signals by radio. The WiGigPHY unit 304 communicates by radio with other WiGig terminals (not illustrated) including the host peer placed in the communication network.

The MAC unit 302 includes media access control (MAC) chips and carries out processing in MAC layers of transmission data and reception data in WiFi and WiGig. More specifically, the MAC unit 302 assembles the communication data from the reception frames inputted from either in use (hereinafter referred to as "physical layer") of the WiFiPHY unit 303 and the WiGigPHY unit 304 by specified processing such as removal of MAC header and outputs the assembled communication data to the USB device I/F unit 301. The MAC unit 302 produces the transmission frames by specified processing such as division of the communication data and addition of MAC header, from the communication data inputted from the USB device I/F unit 301 and outputs the produced transmission frames to the physical layer. The MAC unit 302 uses the WiFiPHY unit 303 and the WiGigPHY unit 304 with switching therebetween and thereby communicates with the host peer or a communication device that relays communication with the host peer.

The MAC unit 302 carries out operations for switching of communication mode (host-side communication mode) of communication (hereinafter referred to as "host-side communication") between the device apparatus 300 and the host apparatus 200, in response to switching of communication mode (network-side communication mode) of network-side communication, as will be described later.

The cable 400 is a USB cable having plugs at both ends and conforming to USB 3.0. The cable 400 provides connection between the USB host I/F unit 201 of the host apparatus 200 and the USB device I/F unit 301 of the device apparatus 300.

In the data transfer system 100, the device apparatus 300 may mediate communication (hereinafter referred to as "data communication") between the host apparatus 200 and the host peer. The device apparatus 300 may select the communication mode that is used for the network-side communication, from WiFi and WiGig.

<Switching of Network-Side Communication>

WiFi is a radio communication mode in which maximum data transfer rate of 1.3 gigabits per second (Gbps) may be attained at a distance equal to or shorter than about 200 meters. By contrast, WiGig is a radio communication mode in which maximum data transfer rate of 7 Gbps may be attained at a distance equal to or shorter than about 10 meters. That is, WiGig is the communication mode higher in the data transfer rate than WiFi.

The MAC unit 302 initially carries out the network-side communication by WiGig and performs switching to WiFi when communication speed is decreased by degradation in communication state or the like, for instance. More specifically, the MAC unit 302 switches the network-side communication to WiFi when detecting that packet loss in WiGig becomes equal to or greater than a specified threshold, for instance. The MAC unit 302 switches the network-side communication to WiGig when detecting that packet loss in WiFi becomes equal to or smaller than a specified threshold, for instance.

Thus the device apparatus 300 is capable of carrying out the network-side communication while using advantages of both WiFi and WiGig.

<Switching of Host-Side Communication>

The USB 3.0 host interface may be operated as the USB 2.0 host interface, as described above. Maximum data transfer rate of USB 3.0 is 5 Gbps and maximum data transfer rate of USB 2.0 is 480 megabits per second (Mbps). That is, USB 3.0 matches WiGig and USB 2.0 matches WiFi in terms of the maximum data transfer rate.

High-speed performance of WiGig may not be utilized on condition that the host-side communication is carried out with USB 2.0 though the network-side communication is carried out with WiGig. On condition that the host-side communication is carried out with USB 3.0 though the network-side communication is carried out with WiFi, on the other hand, the host-side communication is carried out at unnecessarily high speed and power consumption is thereby increased.

Therefore, the device apparatus 300 dynamically switches the communication mode (USB 3.0, USB 2.0) that is used in the host-side communication in accordance with the communication mode (WiGig, WiFi) that is used in the network-side communication. That is, the device apparatus 300 makes the USB device I/F unit 301 operate with USB 2.0, when the WiFiPHY unit 303 is used, or makes the USB device I/F unit 301 operate with USB 3.0, when the WiGigPHY unit 304 is used.

Alteration in the communication mode that is used in the network-side communication may be carried out in middle of data communication (such switching of the communication mode will be referred to as "communication switching" hereinafter). Therefore, the device apparatus 300 promptly switches the communication mode in the host-side communication from USB 3.0 to USB 2.0 when switching the communication mode in the network-side communication from WiGig to WiFi, for instance.

There is a possibility, however, that the switching of the communication mode in the host-side communication may influence communication switching time for the whole system and may consequently degrade quality of the data communication. That is because processing (hereinafter referred to as "negotiation") in which setting information requisite for communication is exchanged between the USB host and the USB device is demanded in order to make it possible to perform USB communication in new communication mode. Namely, the switching of the communication mode in the host-side communication is time-consuming. A period of time taken for the negotiation is about 75 milliseconds (ms) in the switching from USB 3.0 to USB 2.0 or about 180 ms in the switching from USB 2.0 to USB 3.0.

Therefore, the data transfer system 100 acquires in advance information (hereinafter referred to as "negotiation information") that is to be acquired from the peer in the negotiation for the communication switching. Thus the data transfer system 100 promptly switches the communication mode in the host-side communication without carrying out the negotiation.

<Operations of System>

Figure 2:
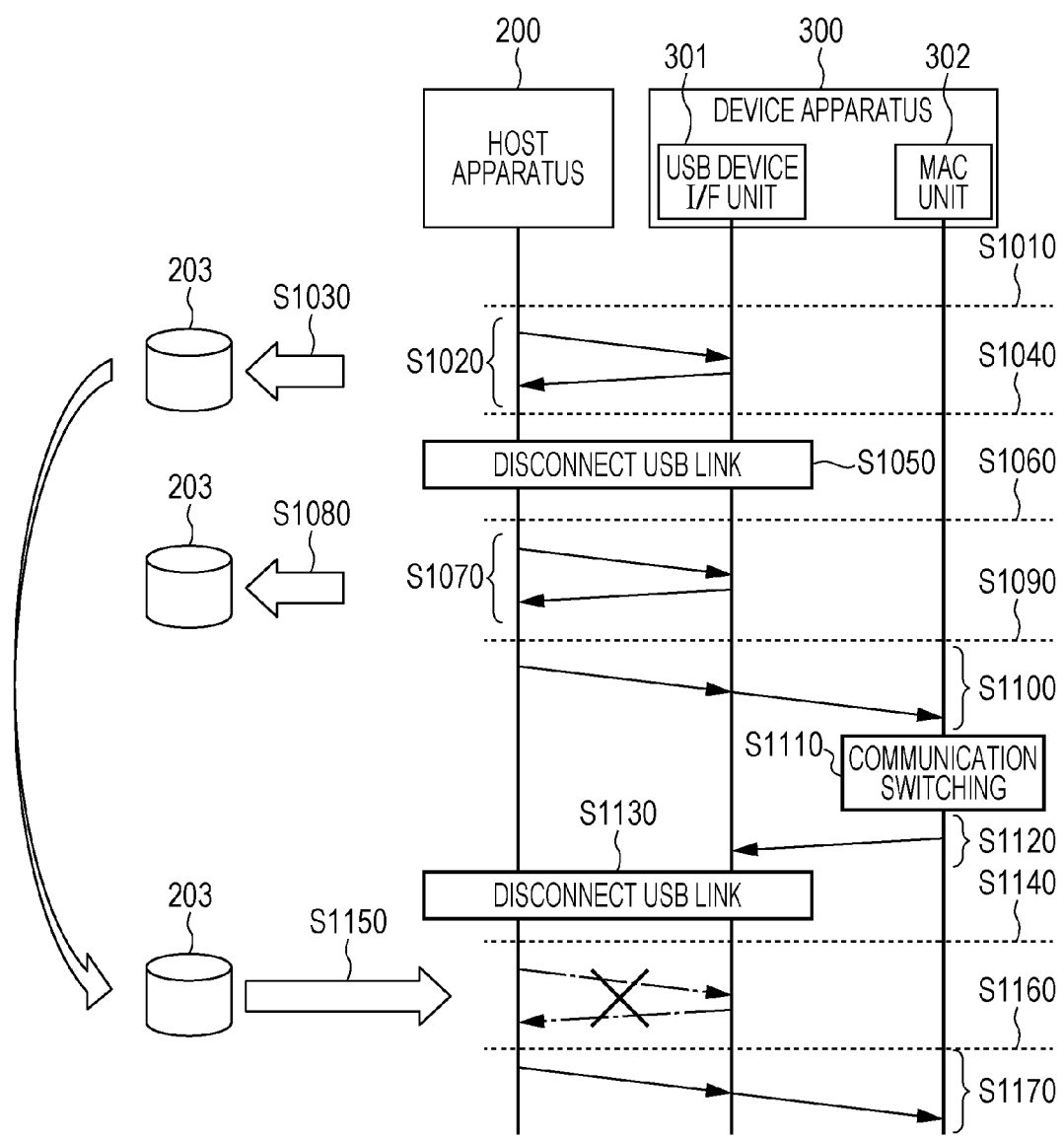
FIG. 2 illustrates an example of operations of the data transfer system according to embodiment 1.
Figure 3:
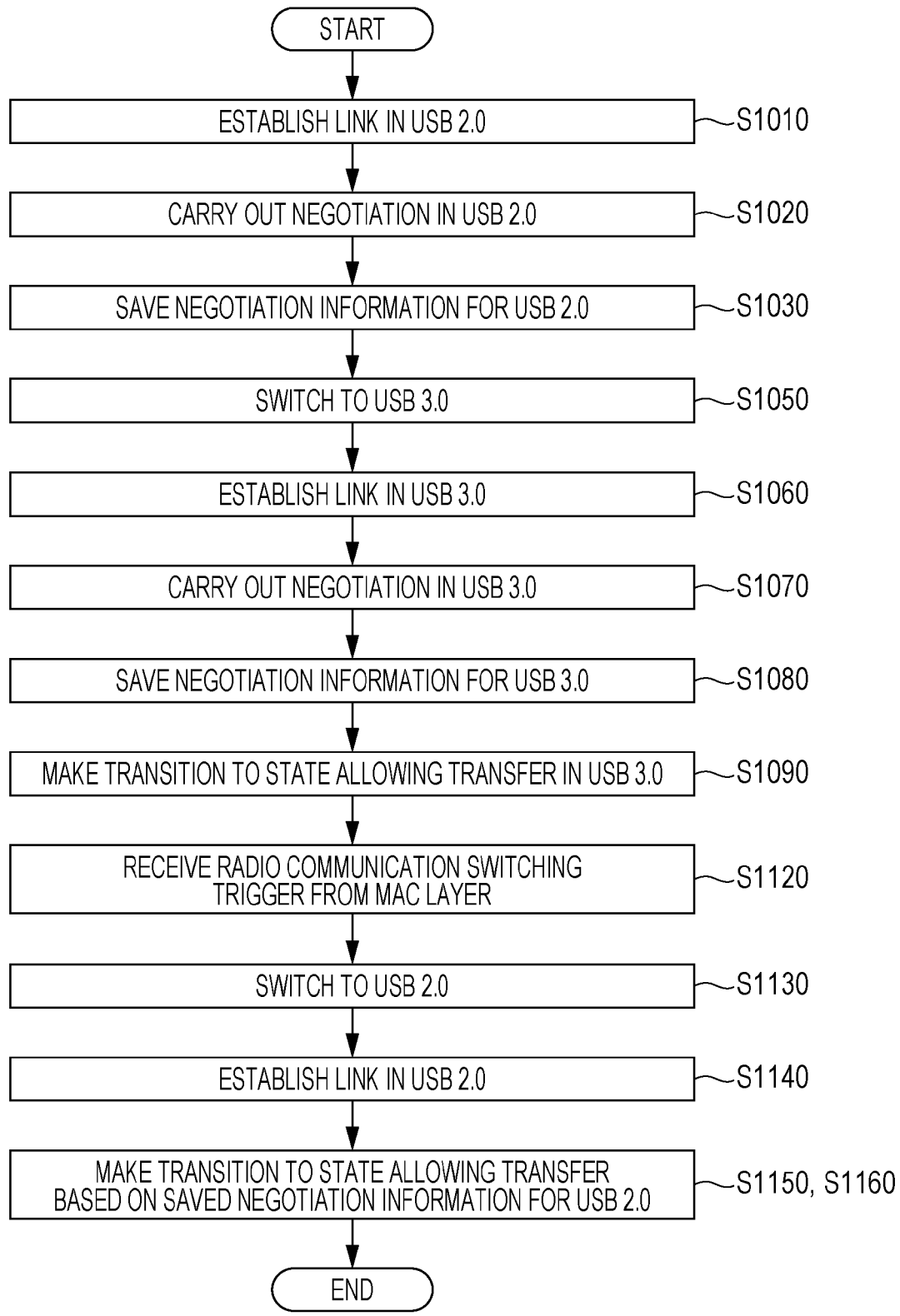
FIG. 3 illustrates the example of the operations of the data transfer system according to embodiment 1.

With use of FIGS. 2 and 3, an outline of operations of the data transfer system 100 will be described. FIG. 2 illustrates an example of the operations of the data transfer system 100. FIG. 3 illustrates the example of the operations of the data transfer system 100.

When connected through the cable 400, the host apparatus 200 and the device apparatus 300 establishes a link in USB 2.0 between the USB host I/F unit 201 and the USB device I/F unit 301 (S1010). After the link is established, the negotiation is carried out and the USB device I/F unit 301 transmits the negotiation information in USB 2.0 (negotiation information for USB 2.0) to the USB host I/F unit 201 (S1020).

The negotiation information in the embodiment is descriptor information on device descriptor, endpoint descriptor, configuration descriptor, and the like. The negotiation information is transmitted in one direction from the USB device to the USB host.

The host apparatus 200 saves the negotiation information, received from the device apparatus 300, to the storage unit 203 (S1030). This processing is carried out by the arithmetic unit 202 of the host apparatus 200, for instance. When the device apparatus 300 having completed the negotiation makes transition to a state in which transfer in USB 2.0 may be carried out (S1040), the device apparatus 300 disconnects the USB 2.0 link and switches the communication mode in the host-side communication to USB 3.0 (S1050).

Subsequently, the host apparatus 200 and the device apparatus 300 carry out training between the USB host I/F unit 201 and the USB device I/F unit 301 and establish a link in USB 3.0 (S1060). As is the case with USB 2.0, the host apparatus 200 carries out the negotiation, receives the negotiation information in USB 3.0 (negotiation information for USB 3.0) from the device apparatus 300 (S1070), and saves the received negotiation information to the storage unit 203 (S1080).

When the device apparatus 300 makes transition to a state in which transfer in USB 3.0 may be carried out (S1090), the device apparatus 300 launches WiGig. Then the device apparatus 300 carries out the network-side communication with use of WiGig and carries out the host-side communication with use of USB 3.0, while carrying out data transfer between those communication schemes (S1100).

It is assumed that the MAC unit 302 of the device apparatus 300 then carries out the communication switching from WiGig to WiFi (S1110). That is, it is assumed that the device apparatus 300 then launches WiFi and stops WiGig.

When the switching is carried out, the MAC unit 302 outputs trigger (hereinafter referred to as "radio communication switching trigger"), indicating that the communication switching is going to be carried out, to the USB device I/F unit 301. That is, the USB device I/F unit 301 receives the radio communication switching trigger from the MAC layer (S1120). The USB device I/F unit 301, having received the trigger, disconnects the USB 3.0 link and switches the communication mode in the host-side communication to USB 2.0 (S1130).

That is, the host apparatus 200 and the device apparatus 300 reestablish the link in USB 2.0 (S1140). The host apparatus 200 reads out the negotiation information for USB 2.0 saved to the storage unit 203, without carrying out the negotiation, and performs setting of the USB host I/F unit 201 based on the negotiation information (S1150). When the device apparatus 300 makes transition to the state in which the transfer in USB 2.0 may be carried out (S1160), the device apparatus 300 carries out the network-side communication with use of WiFi and carries out the host-side communication with use of USB 2.0, while carrying out data transfer between those communication schemes (S1170).

Thus the data transfer system 100 is capable of carrying out the communication switching without carrying out the negotiation during the communication switching. As a result, the data transfer system 100 is capable of carrying out switching from a mode (hereinafter referred to as "fast mode") in which the data transfer may be carried out with use of WiGig and USB 3.0 to a mode (hereinafter referred to as "slow mode") in which the data transfer may be carried out with use of WiFi and USB 2.0, in a shorter period of time.

The data transfer system 100 may omit the negotiation with use of the saved negotiation information for USB 3.0 in switching from the slow mode to the fast mode, as in the switching from the fast mode to the slow mode. That is, the data transfer system 100 is capable of carrying out the switching from the slow mode to the fast mode, in a shorter period of time.

<Details of Apparatuses>

Hereinbelow, details of functional configurations and operations of the apparatuses that are for attaining system operations described above will be described. Illustration and description of the processing for the reuse of the negotiation information in the switching from the slow mode to the fast mode are omitted.

<Configurations of Apparatuses>

Initially, the configurations of the apparatuses will be described.

Figure 4:
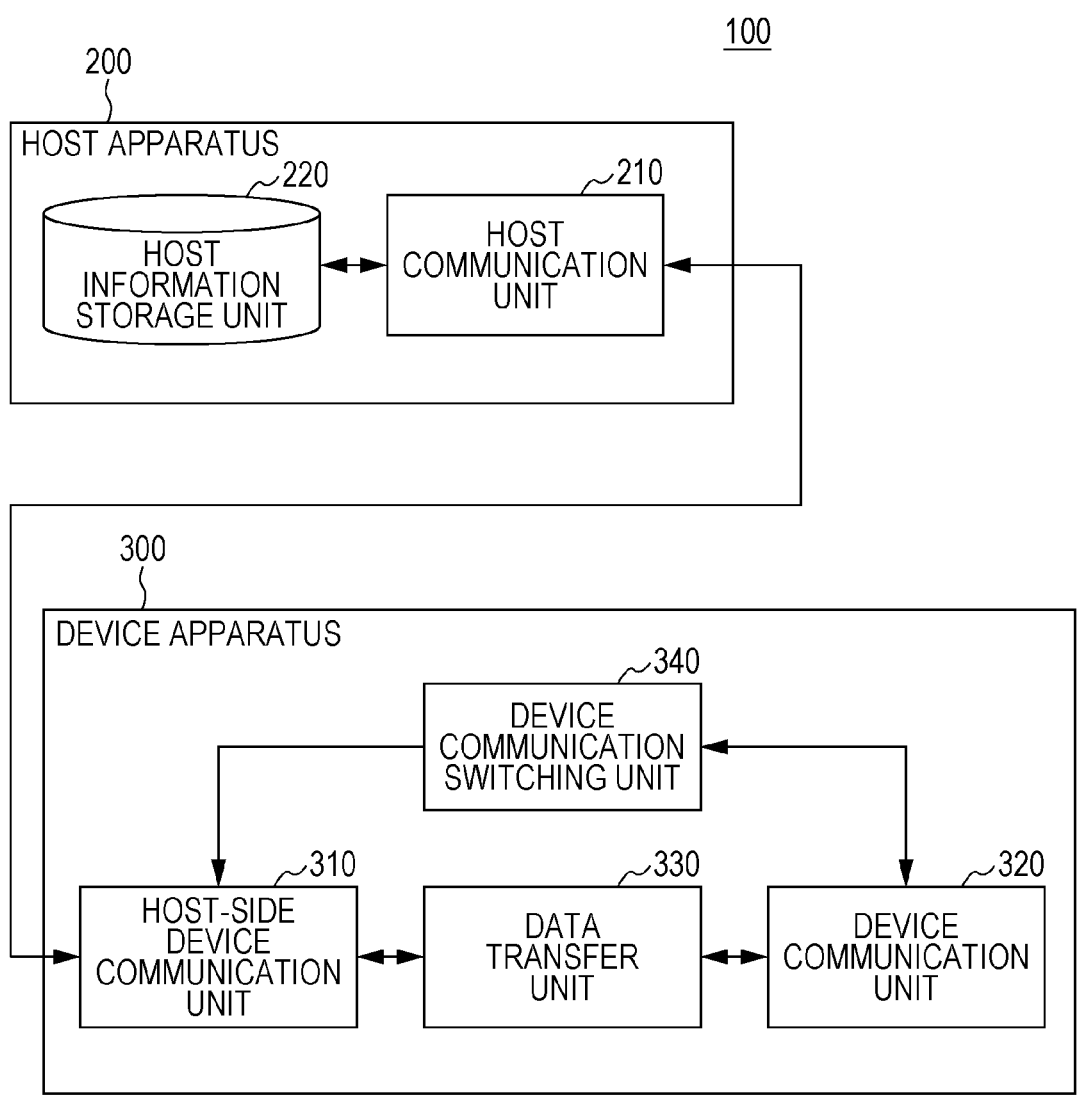
FIG. 4 illustrates an example of functional configurations of apparatuses according to embodiment 1.

FIG. 4 is a block diagram illustrating an example of the configurations of the apparatuses.

As illustrated in FIG. 4, the host apparatus 200 includes a host communication unit 210 and a host information storage unit 220. The device apparatus 300 includes a host-side device communication unit 310, a device communication unit 320, a data transfer unit 330, and a device communication switching unit 340.

The host communication unit 210 supports USB 3.0 (first communication mode) and USB 2.0 (second communication mode) and communicates with the host-side device communication unit 310. When the negotiation information for USB 2.0 is acquired, the host communication unit 210 stores the negotiation information in the host information storage unit 220.

The host communication unit 210 carries out the negotiation in USB 2.0 before starting the communication in USB 3.0. In the communication switching described above, the host communication unit 210 reads out and uses the negotiation information for USB 2.0 stored in the host information storage unit 220, without carrying out the negotiation in USB 2.0.

The host information storage unit 220 holds the negotiation information for USB 2.0 stored under instructions from the host communication unit 210.

In the host apparatus 200, the host communication unit 210 corresponds to hardware relating to the USB host I/F unit 201, the arithmetic unit 202, and the storage unit 203 of FIG. 1, for instance. In particular, the processing for the reuse of the negotiation information in the host communication unit 210 is carried out by the arithmetic unit 202. In this configuration, the processing in the host communication unit 210 is attained by execution of control programs by CPU, for instance. The host information storage unit 220 corresponds to hardware relating to the storage unit 203 of FIG. 1, for instance.

The host-side device communication unit 310 supports USB 3.0 (first communication mode) and USB 2.0 (second communication mode) and communicates with the host communication unit 210 (host-side communication).

The device communication unit 320 communicates while carrying out the switching between WiGig and WiFi (network-side communication).

The data transfer unit 330 carries out data transfer between the host-side device communication unit 310 and the device communication unit 320. That is, data the host-side device communication unit 310 receives through the host-side communication is transmitted from the device communication unit 320 through the network-side communication and data the device communication unit 320 receives through the network-side communication is transmitted from the host-side device communication unit 310 through the host-side communication.

The device communication switching unit 340 switches the communication mode that is used by the host-side device communication unit 310, in response to the switching of the communication mode that is used by the device communication unit 320. More specifically, the device communication switching unit 340 switches the host-side communication of the host-side device communication unit 310 from USB 3.0 to USB 2.0 when the device communication unit 320 switches the network-side communication from WiGig to WiFi (communication switching).

In the device apparatus 300, the host-side device communication unit 310 corresponds to the USB device I/F unit 301 of FIG. 1, for instance, and the device communication unit 320 corresponds to the WiFiPHY unit 303, the WiGigPHY unit 304, and the MAC unit 302 of FIG. 1, for instance. The device communication switching unit 340 corresponds to the MAC unit 302, for instance.

The device apparatus 300 having the configurations described above is capable of promptly starting the switching of the communication mode in the host-side communication when the communication switching in the network-side communication is carried out. The host apparatus 200 having the configurations described above is capable of carrying out the switching of the communication mode in the host-side communication without carrying out the negotiation during the communication switching. Thus the data transfer system 100 composed of the apparatuses is capable of carrying out the switching from the fast mode to the slow mode in the short period of time.

<Operations of Apparatuses>

Subsequently, the operations of the apparatuses will be described.

Figure 5:
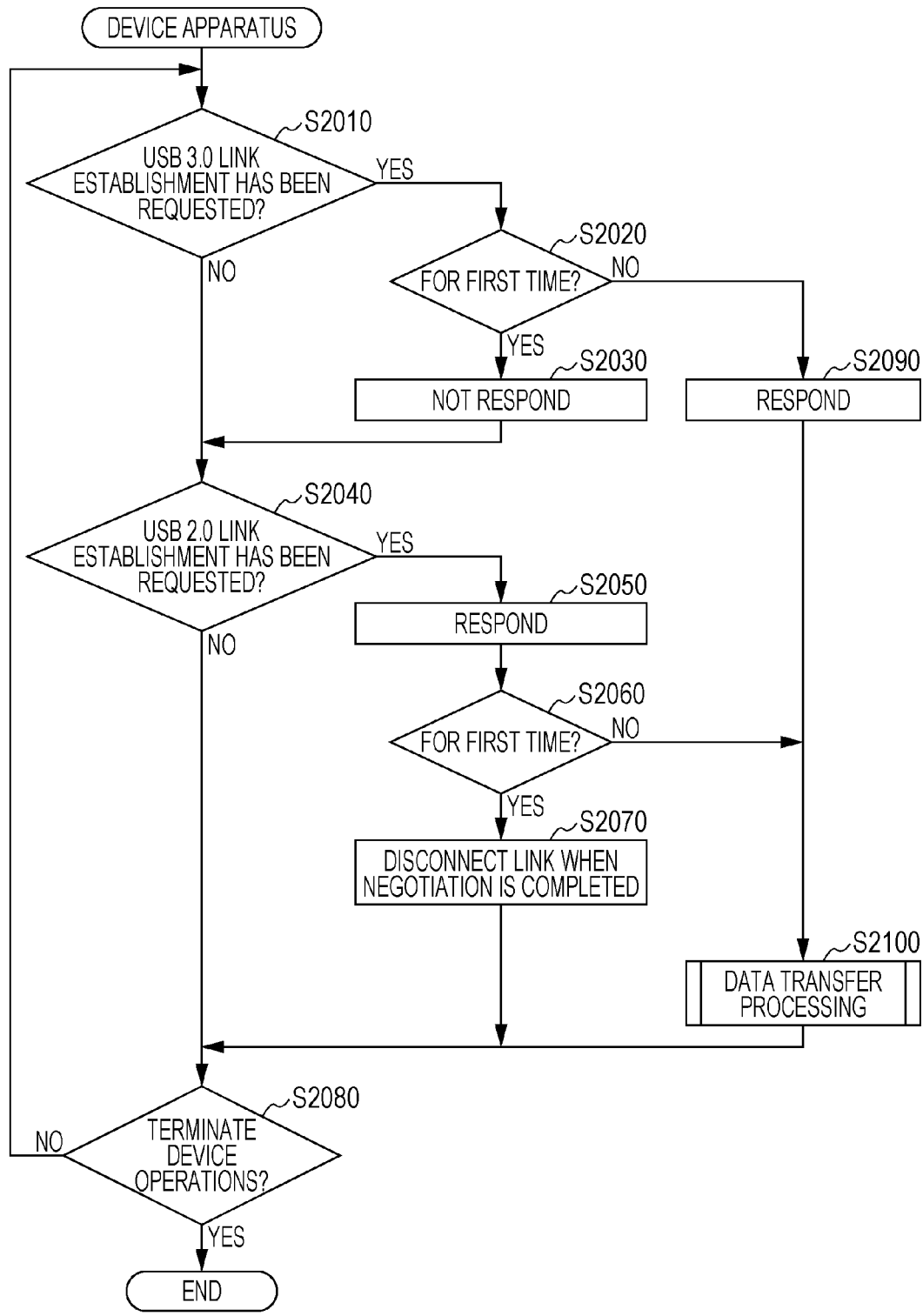
FIG. 5 illustrates an example of operations of a device apparatus according to embodiment 1.

FIG. 5 is a flow chart illustrating an example of the operations of the device apparatus 300.

In step S2010, initially, the host-side device communication unit 310 determines whether USB 3.0 link establishment has been requested or not from the host apparatus 200. If the USB 3.0 link establishment has been requested (S2010: YES), the host-side device communication unit 310 advances the processing to step S2020. If the USB 3.0 link establishment has not been requested (S2010: NO), the host-side device communication unit 310 advances the processing to step S2040 that will be described later.

In step S2020, the host-side device communication unit 310 determines whether the USB 3.0 link establishment has been requested for the first time from the host apparatus 200. If the USB 3.0 link establishment has been requested for the first time (S2020: YES), the host-side device communication unit 310 advances the processing to step S2030. If the USB 3.0 link establishment has not been requested for the first time (S2020: NO), the host-side device communication unit 310 advances the processing to step S2090 that will be described later.

When connected to the device apparatus 300, the host apparatus 200 initially requests the link establishment in USB 3.0 that is a superior communication mode, as will be described later. When the USB 3.0 link establishment fails or when the USB 3.0 link is disconnected, subsequently, the host apparatus 200 requests the link establishment in USB 2.0 that is an inferior communication mode. When the device apparatus 300 is connected to the host apparatus 200, therefore, the processing initially advances to step S2030.

In step S2030, the host-side device communication unit 310 does not respond to the request for the USB 3.0 link establishment. That is, the host-side device communication unit 310 conceals from the host apparatus 200 that the host-side device communication unit 310 supports USB 3.0. This is intended for making the host apparatus 200 subsequently request the USB 2.0 link establishment.

In step S2040, the host-side device communication unit 310 determines whether USB 2.0 link establishment has been requested or not from the host apparatus 200. If the USB 2.0 link establishment has been requested (S2040: YES), the host-side device communication unit 310 advances the processing to step S2050. If the USB 2.0 link establishment has not been requested (S2040: NO), the host-side device communication unit 310 advances the processing to step S2080 that will be described later.

When the USB 3.0 link establishment fails, as described above, the host apparatus 200 subsequently requests the USB 2.0 link establishment. Just after it is concealed in step S2030 that the host-side device communication unit 310 supports USB 3.0, consequently, the processing advances to step S2050.

In step S2050, the host-side device communication unit 310 responds to the request for the USB 2.0 link establishment.

In step S2060, the host-side device communication unit 310 determines whether the USB 2.0 link establishment has been requested for the first time from the host apparatus 200. If the USB 2.0 link establishment has been requested for the first time (S2060: YES), the host-side device communication unit 310 advances the processing to step S2070. If the USB 2.0 link establishment has not been requested for the first time (S2060: NO), the host-side device communication unit 310 advances the processing to step S2100 that will be described later.

When the USB 3.0 link establishment fails, as described above, the host apparatus 200 subsequently requests the USB 2.0 link establishment. Just after it is concealed in step S2030 that the host-side device communication unit 310 supports USB 3.0 and the USB 2.0 link establishment is determined to have been requested for the first time at step S2060, consequently, the processing advances to step S2070.

In step S2070, the host-side device communication unit 310 carries out normal USB device operations and the negotiation with the host apparatus 200. In the negotiation, the host-side device communication unit 310 transmits the negotiation information (descriptor information) for the device apparatus 300, to the host apparatus 200. When the negotiation is completed, the host-side device communication unit 310 disconnects the link.

In step S2080, the host-side device communication unit 310 determines whether instructions to terminate the USB device operations have been given or not through user operations or the like. If the instructions to terminate the USB device operations have not been given (S2080: NO), the host-side device communication unit 310 returns the processing to step S2010.

When the USB 2.0 link is disconnected, the host apparatus 200 subsequently requests afresh the USB 3.0 link establishment, as will be described later. Just after the USB 2.0 link is disconnected, consequently, the USB 3.0 link establishment is requested afresh (S2010: YES) and the processing advances to step S2020 again. This is, however, the second time that the USB 3.0 link establishment is requested (S2020: NO), and thus the processing advances to step S2090.

In step S2090, the host-side device communication unit 310 responds to the request for the USB 3.0 link establishment.

In step S2100, the device apparatus 300 carries out data transfer processing. When the data transfer processing is completed, the processing is returned to step S2080. Details of the data transfer processing will be described later.

If the host-side device communication unit 310 has been given the instructions to terminate the USB device operations (S2080: YES), the host-side device communication unit 310 terminates the series of processing.

When the processing advances from step S2090 to step S2100, that is, when the host-side communication is carried out with USB 3.0, the device communication unit 320 initially starts the network-side communication with WiGig. When the processing advances from step S2060 to step S2100, that is, when the host-side communication is carried out with USB 2.0, the device communication unit 320 starts the network-side communication with WiFi.

Figure 6:
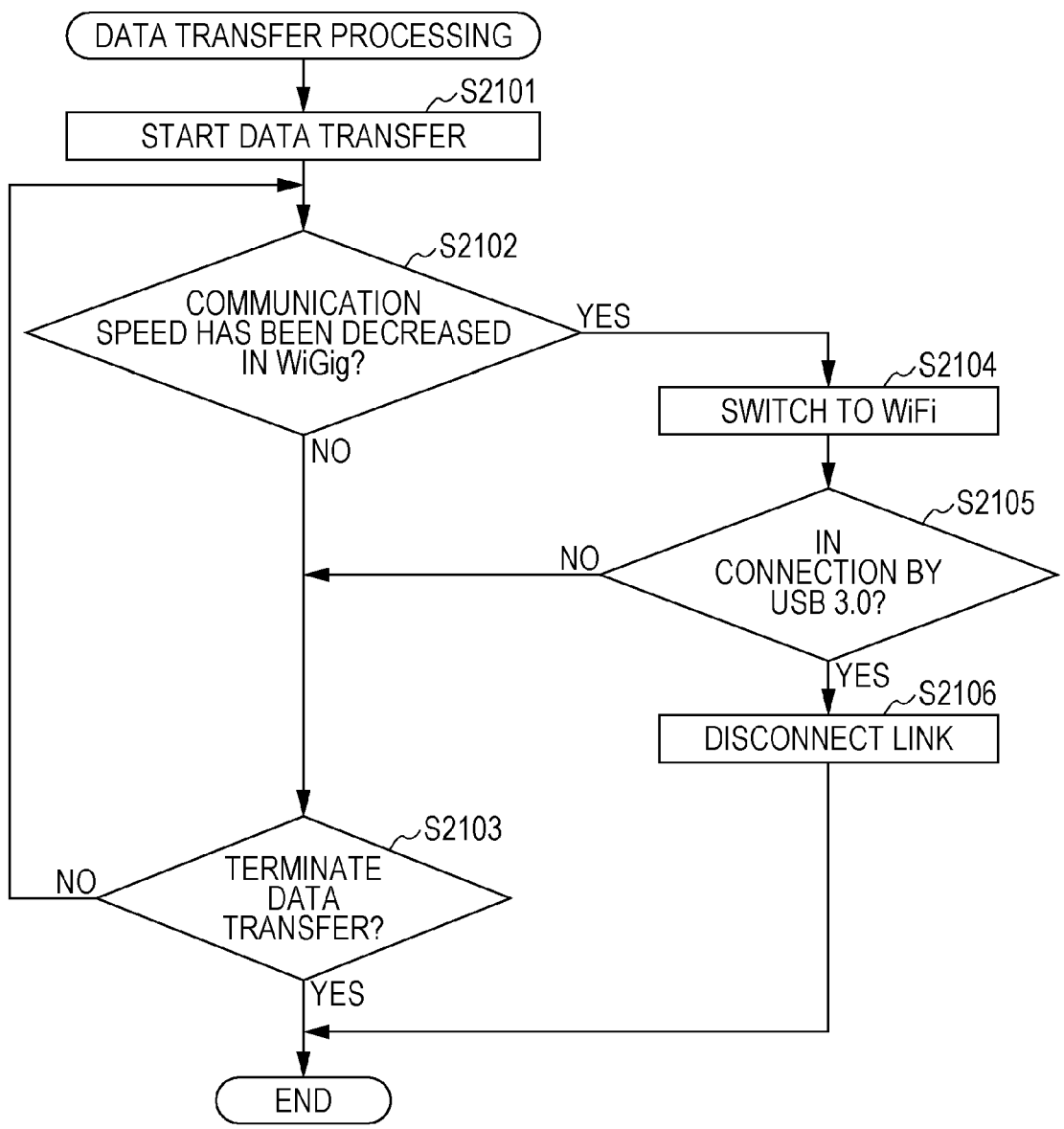
FIG. 6 illustrates an example of data transfer processing in embodiment 1.

FIG. 6 is a flow chart illustrating an example of the data transfer processing in the device apparatus 300.

In step S2101, initially, the data transfer unit 330 starts the data transfer between the host-side communication and the network-side communication.

In step S2102, the device communication unit 320 determines whether the network-side communication is carried out with WiGig and whether the communication speed has been decreased to a specified level. In case where the network-side communication is carried out with WiFi or in case where the network-side communication is carried out with WiGig and where the communication speed has not been decreased (S2102: NO), the device communication unit 320 advances the processing to step S2103. In case where the communication speed has been decreased in WiGig (S2102: YES), the device communication unit 320 advances the processing to step S2104 that will be described later.

In step S2103, the data transfer unit 330 determines whether the data transfer is to be terminated or not. A case where the data transfer is to be terminated represents a case where the link with the host apparatus 200 is disconnected, for instance. If the data transfer is not to be terminated (S2103: NO), the data transfer unit 330 returns the processing to step S2102. If the data transfer is to be terminated (S2103: YES), the data transfer unit 330 advances the processing to step S2080 of FIG. 5.

That is, the device apparatus 300 continues monitoring whether the communication speed has been decreased or not in WiGig until the link is disconnected and advances the processing to step S2104 when the communication speed is decreased in WiGig.

In step S2104, the device communication unit 320 switches the communication mode that is used for the network-side communication, from WiGig to WiFi. The device communication switching unit 340 detects this switching. Alternatively, the device communication switching unit 340 may carry out the processing from step S2102 to step S2104.

In step S2105, the device communication switching unit 340 determines whether the host-side device communication unit 310 is in connection with the host apparatus 200 by USB 3.0. If the connection by USB 3.0 is not active (S2105: NO), the device communication switching unit 340 advances the processing to step S2103. If the connection by USB 3.0 is active (S2105: YES), the device communication switching unit 340 advances the processing to step S2106.

In the embodiment, the host apparatus 200 supports USB 3.0. When the processing advances to step S2105, therefore, the host-side device communication unit 310 is normally in connection with the host apparatus 200 by USB 3.0.

In step S2106, the device communication switching unit 340 makes the host-side device communication unit 310 disconnect the link with the host apparatus 200 by USB 3.0 and advances the processing to step S2080 of FIG. 5. The disconnection of the link is attained by output of the radio communication switching trigger, described above, from the MAC unit 302 to the USB device I/F unit 301, for instance.

When the USB 3.0 link is disconnected, the host apparatus 200 requests the USB 2.0 link establishment, as described above. Just after the USB 3.0 link is disconnected in step S2106, accordingly, the processing makes transition to the data transfer processing in USB 2.0 (step S2100 in FIG. 5, FIG. 6) via steps S2040 through S2060 in FIG. 5. That is, the operations of the data transfer system 100 are switched from the fast mode to the slow mode.

Through the operations as described above, the device apparatus 300 is capable of starting the host-side communication in USB 3.0 after carrying out the negotiation in USB 2.0, when the device apparatus 300 is connected to the host apparatus 200. Besides, the device apparatus 300 is capable of switching the network-side communication from WiGig to WiFi and switching the host-side communication from USB 3.0 to USB 2.0 in response to the communication speed of the network-side communication.

Figure 7:
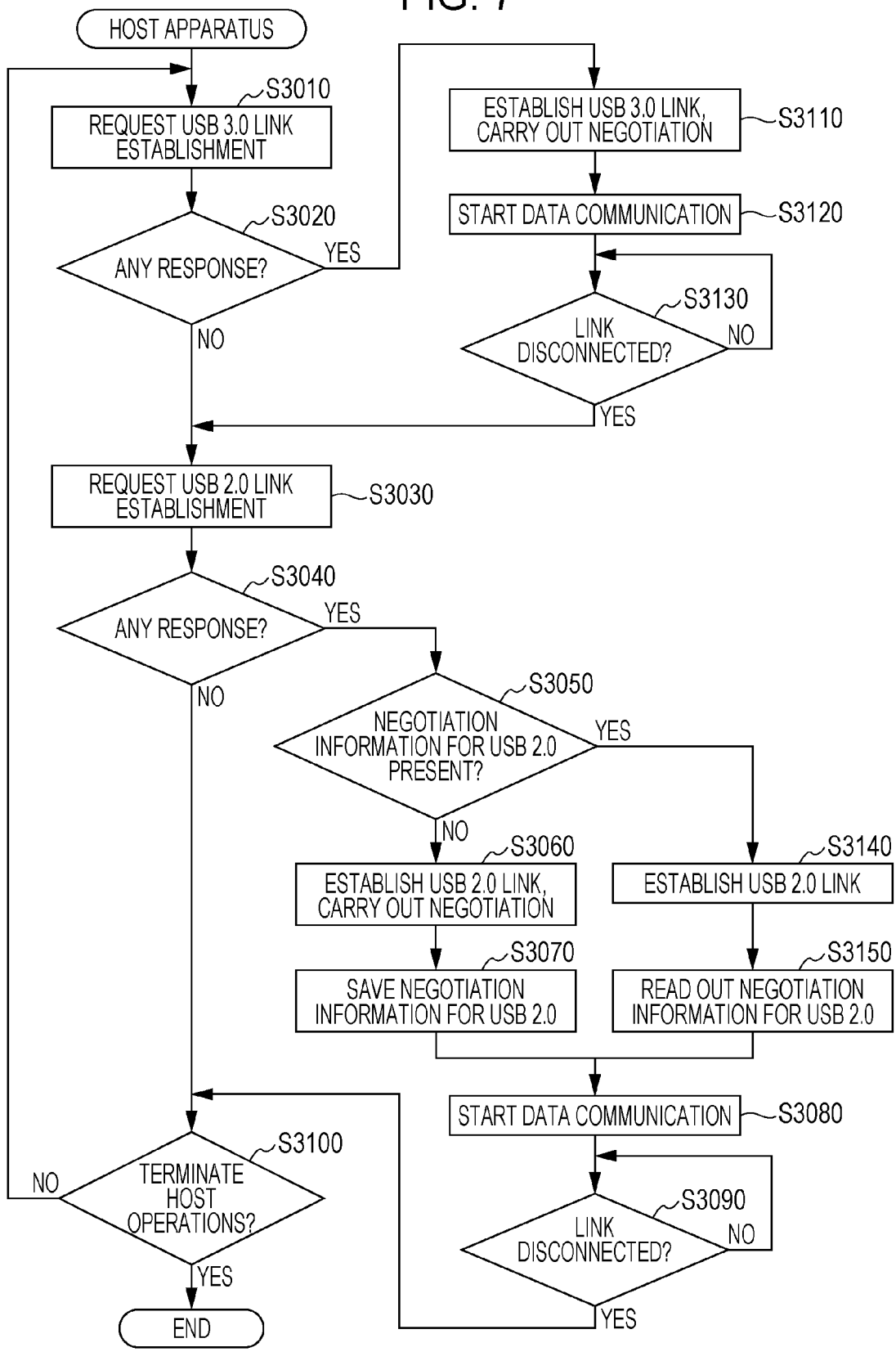
FIG. 7 illustrates an example of operations of a host apparatus according to embodiment 1.

FIG. 7 is a flow chart illustrating an example of the operations of the host apparatus 200.

In step S3010, initially, the host communication unit 210 requests the device apparatus 300 to establish the USB 3.0 link.

In step S3020, the host communication unit 210 determines whether any response to the request made in step S3010 has been received or not from the device apparatus 300. If any such response has not been received (S3020: NO), the host communication unit 210 advances the processing to step S3030. If any such response has been received (S3020: YES), the host communication unit 210 advances the processing to step S3110 that will be described later.

The device apparatus 300 does not respond to the first request for the USB 3.0 link establishment, as described above. When the device apparatus 300 is connected to the host apparatus 200, therefore, the processing initially advances to step S3030.

In step S3030, the host communication unit 210 requests the device apparatus 300 to establish the USB 2.0 link.

In step S3040, the host communication unit 210 determines whether any response to the request made in step S3030 has been received or not from the device apparatus 300. If any such response has been received (S3040: YES), the host communication unit 210 advances the processing to step S3050. If any such response has not been received (S3040: NO), the host communication unit 210 advances the processing to step S3100 that will be described later.

The device apparatus 300 responds to the request for the USB 2.0 link establishment even if the request is made for the first time, as described above. When the device apparatus 300 is connected to the host apparatus 200, therefore, the processing advances to step S3050.

In step S3050, the host communication unit 210 determines whether the negotiation information for USB 2.0 from the device apparatus 300 is stored in the host information storage unit 220. If the negotiation information is not stored (S3050: NO), the host communication unit 210 advances the processing to step S3060. If the negotiation information is stored (S3050: YES), the host communication unit 210 advances the processing to step S3140 that will be described later.

Just after the device apparatus 300 is connected to the host apparatus 200, the negotiation for USB 2.0 has not yet been carried out. Therefore, the processing advances to step S3060.

In step S3060, the host communication unit 210 establishes the USB 2.0 link with the device apparatus 300 and carries out the negotiation. In the negotiation, the host communication unit 210 receives from the device apparatus 300 the negotiation information (descriptor information) for USB 2.0 in the device apparatus 300.

In step S3070, the host communication unit 210 stores and saves the negotiation information for USB 2.0, acquired through the negotiation of step S3060, in the host information storage unit 220.

In step S3080, the host communication unit 210 starts data communication with the host peer via the device apparatus 300. The data communication is communication in the slow mode with use of WiFi and USB 2.0.

In step S3090, the host communication unit 210 determines whether the link with the device apparatus 300 is disconnected or not. The disconnection of the link encompasses not only the disconnection of the link by the device apparatus 300 but also the disconnection of the link by the host communication unit 210. If the link is not disconnected (S3090: NO), the host communication unit 210 iterates such determination processing. When the link is disconnected (S3090: YES), the host communication unit 210 advances the processing to step S3100.

In step S3100, the host communication unit 210 determines whether instructions to terminate USB host operations have been given or not through user operations or the like. If the instructions to terminate the USB host operations have not been given (S3100: NO), the host communication unit 210 returns the processing to step S3010. That is, the host communication unit 210 requests the USB 3.0 link establishment afresh.

Just after carrying out the initial negotiation in USB 2.0, as described above, the device apparatus 300 disconnects the link with the host apparatus 200 and makes transition to a state in which the request for the USB 3.0 link establishment may be accepted. After steps S3050 through S3090, accordingly, the processing advances to step S3110.

In step S3110, the host communication unit 210 establishes the USB 3.0 link with the device apparatus 300 and carries out the negotiation.

The host communication unit 210 may reuse the negotiation information, acquired in the past, without carrying out the negotiation for the establishment of the USB 3.0 link, as is the case with USB 2.0, though illustration and description are omitted. That is, the host communication unit 210 may carry out processing similar to steps S3050 through S3070, S3140, and S3150 that will be described later, in substitution for processing in step S3110.

In step S3120, the host communication unit 210 starts the data communication with the host peer via the device apparatus 300. The data communication is communication in the fast mode with use of WiGig and USB 3.0.

In step S3130, the host communication unit 210 determines whether the link with the device apparatus 300 is disconnected or not. If the link is not disconnected (S3130: NO), the host communication unit 210 iterates such determination processing. If the link is disconnected (S3130: YES), the host communication unit 210 advances the processing to step S3030.

Thus the host communication unit 210 requests the USB 2.0 link establishment afresh (S3030). After initially ignoring the request for the USB 3.0 link establishment, the device apparatus 300 responds to both the request for the USB 3.0 link establishment and the request for the USB 2.0 link establishment (S3040: YES), as described above. Once the negotiation in USB 2.0 is carried out, a state in which the negotiation information for USB 2.0 is stored in the host information storage unit 220 is brought about (S3050). After step S3130, accordingly, the processing advances to step S3140.

In step S3140, the host communication unit 210 establishes the USB 2.0 link with the device apparatus 300. In contrast to the processing of step S3060, however, the host communication unit 210 does not carry out the negotiation in USB 2.0.

In step S3150, the host communication unit 210 reads out and uses the negotiation information for USB 2.0 saved to the host information storage unit 220. Then the host communication unit 210 advances the processing to step S3080 and starts the data communication in the slow mode with the host peer.

When the host communication unit 210 is instructed to terminate the USB host operations while the processing of steps S3010 through S3150 is iterated (S3100: YES), the host communication unit 210 terminates the series of processing.

Through the operations as described above, the host apparatus 200 is capable of saving the negotiation information when the negotiation in USB 2.0 with the device apparatus 300 is carried out. The host apparatus 200 is capable of switching the data communication from the fast mode to the slow mode without carrying out the negotiation afresh when the host-side communication is switched from USB 3.0 to USB 2.0.

That is, the data transfer system 100 is capable of promptly switching the communication mode in the host-side communication when the communication switching in the network-side communication is carried out.

As described above, the data transfer system 100 according to the embodiment switches the communication mode that is used for the host-side communication from USB 3.0 to USB 2.0 when the communication mode that is used for the network-side communication is switched from WiGig to WiFi. Thus the device apparatus 300 is capable of communicating with the host apparatus in the faster communication mode when the device communication unit 320 uses a high communication speed or communicating with the host apparatus in the slower communication mode when the device communication unit 320 uses a low communication speed.

Under condition of low communication speed of the network-side communication, the communication speed of the host-side communication is also lowered and thus reduction in power consumption with reduction in the data transfer rate in the host-side communication has little influence on the data communication. As a result, the data transfer system 100 according to the embodiment is capable of reducing the power consumption resulting from the data transfer while maintaining functional values of the host apparatus 200.

In contrast to the prior art, the device apparatus 300 according to the embodiment does not necessarily require information on transfer rate of the host peer. The device apparatus 300 according to the embodiment may be applied to various data transfer apparatuses that support different communication modes on host side and network side. As a result, the data transfer system 100 according to the embodiment may be applied to a broader range of application.

The data transfer system 100 according to the embodiment carries out the negotiation in USB 2.0 and saves the negotiation information to the host apparatus 200, before starting the data communication in the fast mode with use of WiGig and USB 3.0.

Thus the data transfer system 100 according to the embodiment is capable of making the negotiation in USB 2.0 unnecessary on occasion of the above-mentioned switching from the fast mode to the slow mode and thereby reducing time demanded for the communication switching. That is, the data transfer system 100 according to the embodiment is capable of carrying out the switching from the fast mode to the slow mode in a state in which influence of the switching on the data communication to and from the host apparatus 200 is curbed. As a result, the data transfer system 100 according to the embodiment is capable of reducing the power consumption resulting from the data transfer while maintaining the functional values of the host apparatus 200.

The device apparatus 300 according to the embodiment may be provided through minor alteration to a conventional USB device apparatus. Such alteration is addition of operations of switching the host-side communication in response to the communication switching, concealing the support for USB 3.0, and disconnecting the link after transmission of the negotiation information for USB 2.0, for instance. The host apparatus 200 according to the embodiment also may be provided through minor alteration to a conventional USB host apparatus. Such alteration is addition of operations of saving and reusing the negotiation information, for instance.

As a result, the data transfer system 100 according to the embodiment may be provided in a simple manner and at low cost.

<Modification of the Embodiment>

The data transfer system 100 may reuse the negotiation information for USB 3.0 by a technique similar to the reuse of the negotiation information for USB 2.0. In this configuration, the data transfer system 100 is capable of carrying out the switching from the slow mode to the fast mode, in the state in which influence of the switching on the data communication to and from the host apparatus 200 is curbed. In this configuration, the data transfer system 100 may be configured so as not to reuse the negotiation information for USB 2.0, for instance.

Technology described above may be applied to data transfer systems which include a device apparatus that carries out data transfer between two communication units each supporting a plurality of communication modes and in which a host apparatus requires negotiation information.

Embodiment 2

For embodiment 1, the system in which the host apparatus requires the negotiation information has been described. For embodiment 2 of the disclosure, a system in which both a host apparatus and a device apparatus make use of negotiation information will be described.

Embodiment 2 is an example of a specific aspect in which the data transfer apparatus of the disclosure is applied to a data transfer system including a PCI express (PCIe) host interface.

<Hardware Configuration>

Figure 8:
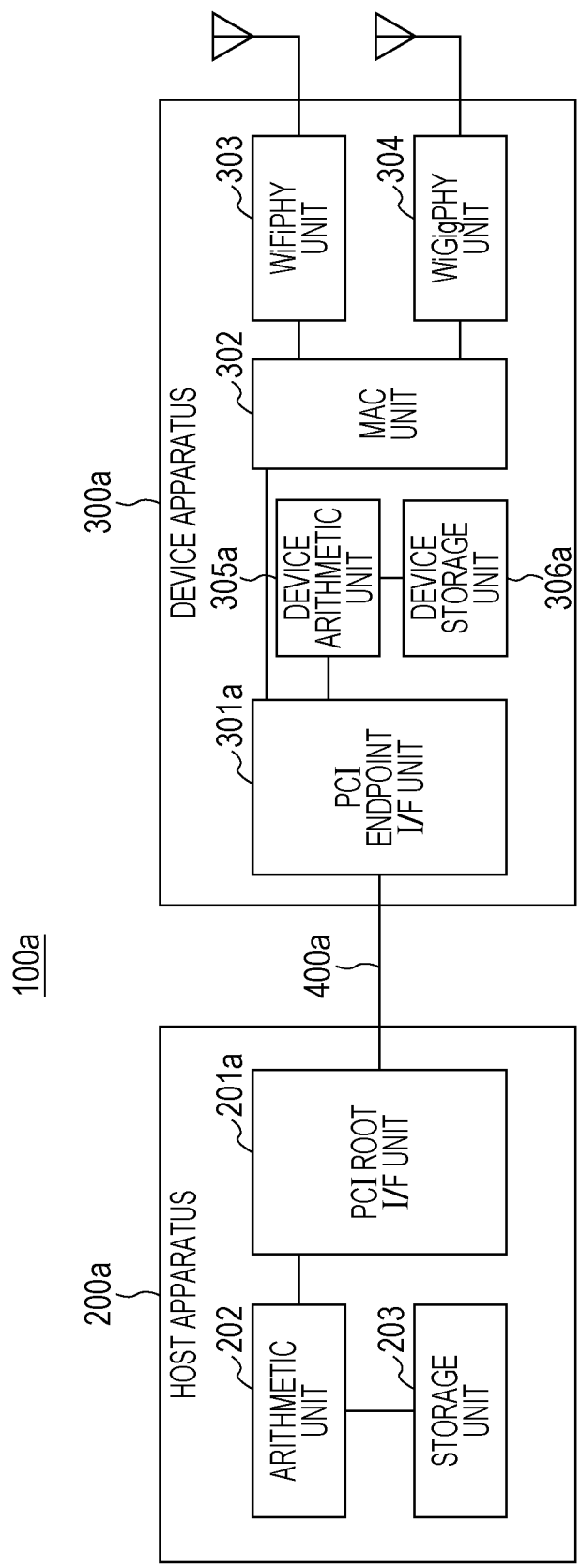
FIG. 8 illustrates an example of a hardware configuration of a data transfer system according to embodiment 2 of the disclosure.

FIG. 8 illustrates an example of a hardware configuration of the data transfer system according to the embodiment and corresponds to FIG. 1 of embodiment 1. Components identical to those in FIG. 1 are designated by the same reference numerals and description thereon is appropriately omitted.

In FIG. 8, the data transfer system 100a includes a host apparatus 200a, a device apparatus 300a, and a cable 400a.

The host apparatus 200a includes a PCI root I/F unit 201a in place of the USB host I/F unit 201 of FIG. 1. The PCI root I/F unit 201a is connected to the arithmetic unit 202.

The PCI root I/F unit 201a includes root complex of PCI Express and carries out operations of a PCI Express host. In PCI Express, a plurality of specifications, namely, Gen1, Gen2, and Gen3 may be applied with switching thereamong. On condition that link width is x1, data transfer rates under Gen1, Gen2, and Gen3 are 2.5 Gbps, 5 Gbps, and 8 Gbps, respectively.

The device apparatus 300a includes the data transfer apparatus of the disclosure. The device apparatus 300a includes a PCI endpoint I/F unit 301a in place of the USB device I/F unit 301 of FIG. 1 and further includes a device arithmetic unit 305a and a device storage unit 306a. The PCI endpoint I/F unit 301a and the device storage unit 306a are connected to the device arithmetic unit 305a.

The PCI endpoint I/F unit 301a includes an endpoint of PCI Express and carries out operations of a PCI Express device. The PCI endpoint I/F unit 301a communicates with the PCI root I/F unit 201a of the host apparatus 200a through the cable 400a. That is, the PCI endpoint I/F unit 301a is the PCI Express host interface.

The device arithmetic unit 305a is an arithmetic processing unit such as a CPU.

The device storage unit 306a is an information recording medium such as a flash memory.

The cable 400a is a PCI connector having plugs at both ends and provides connection between the PCI root I/F unit 201a of the host apparatus 200a and the PCI endpoint I/F unit 301a of the device apparatus 300a.

For PCI Express, device side is required to receive setting of negotiation information from host side. In the embodiment, therefore, the device apparatus 300a also saves and reuses the negotiation information. The negotiation information in the embodiment is register information such as device information and power information a configuration register indicates.

Gen2 of PCI Express (hereinafter will be referred to simply as "Gen2") corresponds to USB 3.0, and Gen1 of PCI Express (hereinafter will be referred to simply as "Gen1") corresponds to USB 2.0.

Basically, the data transfer system 100a attains operations similar to those of the data transfer system 100 described for embodiment 1. That is, the operations of the data transfer system 100a are basically similar to the operations of the data transfer system 100 in which USB 3.0 is replaced by Gen2 and in which USB 2.0 is replaced by Gen1. Therefore, differences from embodiment 1 will chiefly be described below.

<Operations of System>

Figure 9:
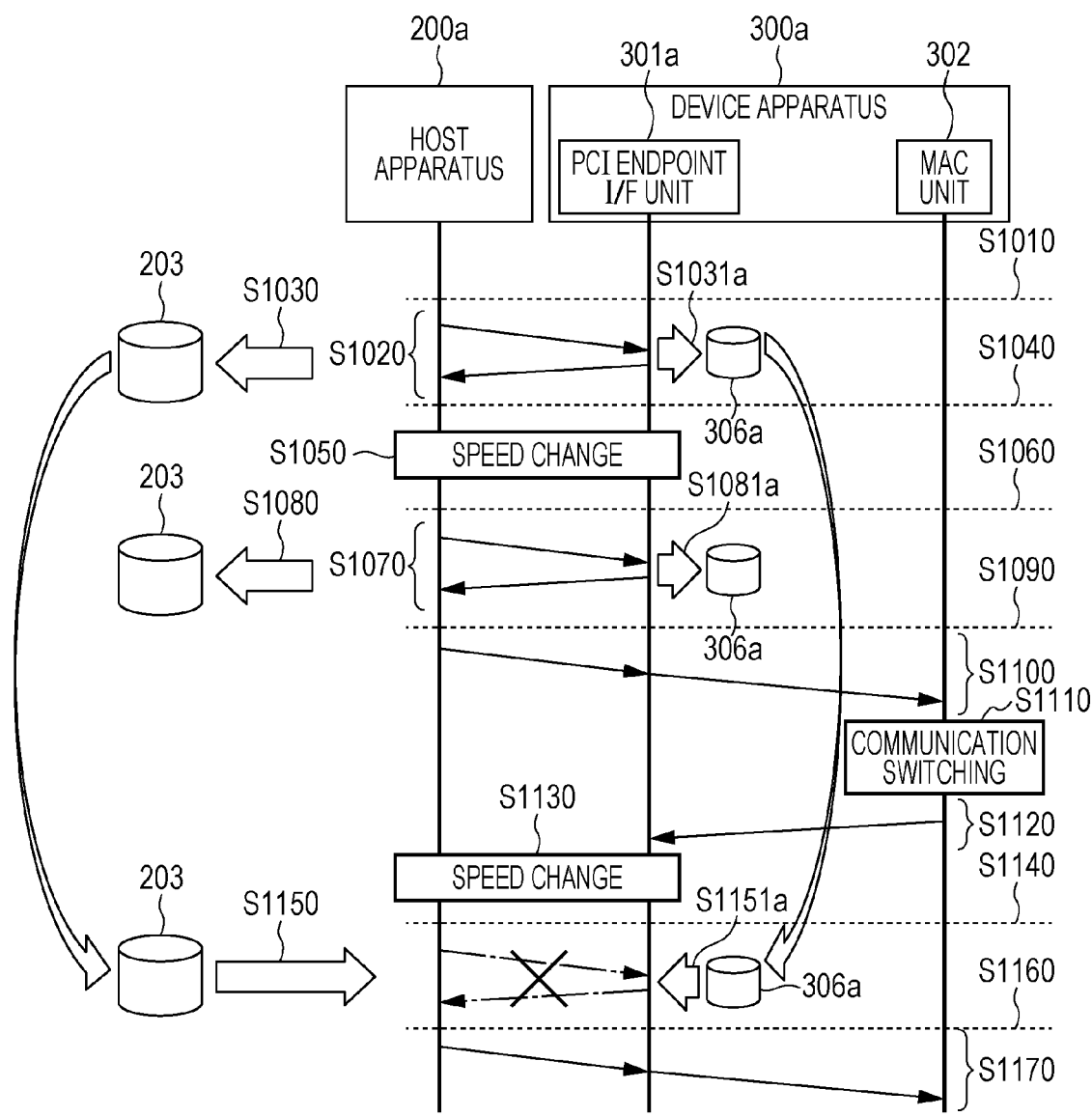
FIG. 9 illustrates an example of operations of the data transfer system according to embodiment 2.
Figure 10:
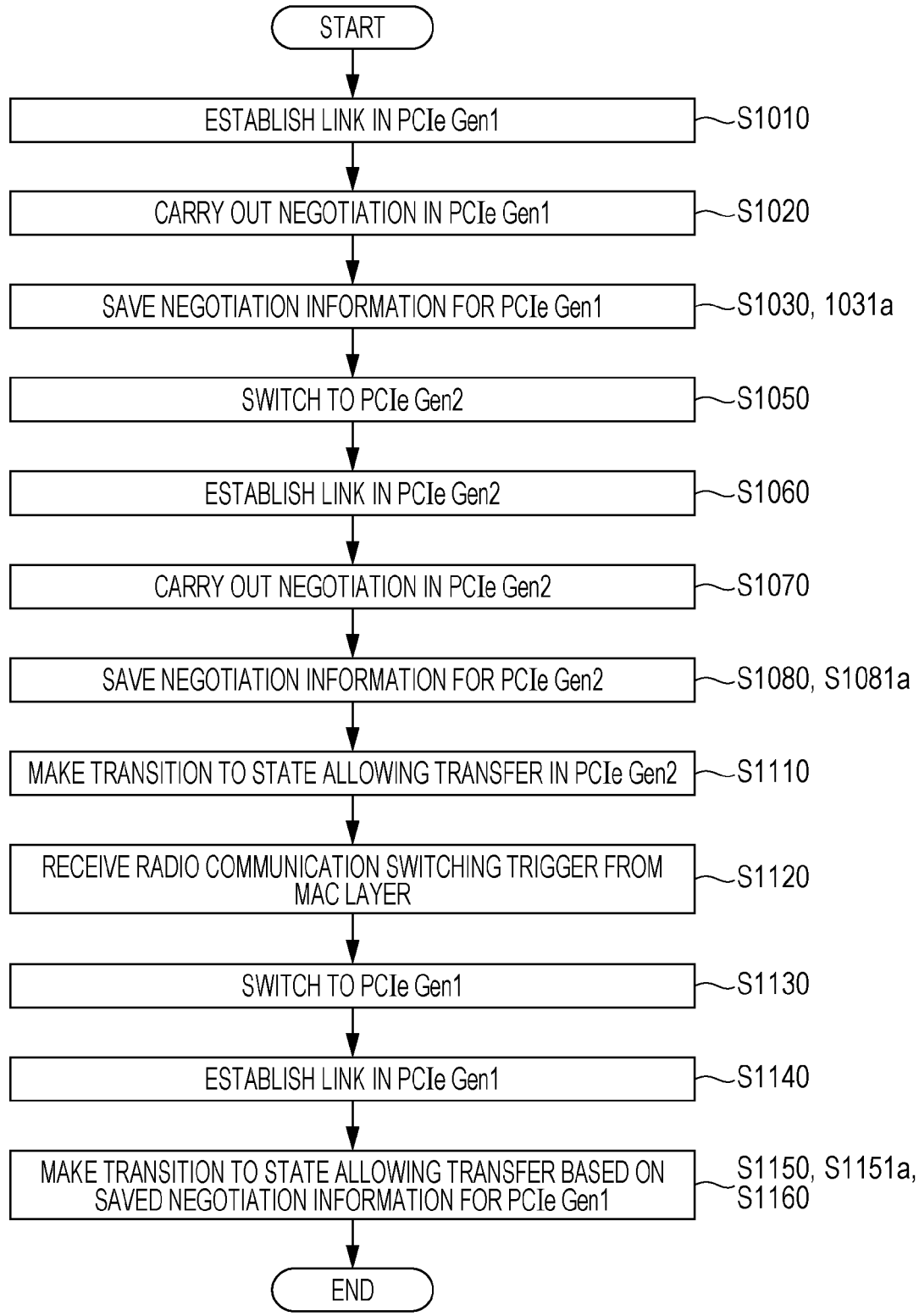
FIG. 10 illustrates an example of the operations of the data transfer system according to embodiment 2.

FIG. 9 illustrates an example of the operations of the data transfer system 100a and corresponds to FIG. 2 of embodiment 1. FIG. 10 illustrates an example of the operations of the data transfer system and corresponds to FIG. 3 of embodiment 1. Components corresponding to those in FIGS. 2 and 3 are designated by the same sequence numbers and description thereon is appropriately omitted.

As illustrated in FIGS. 9 and 10, the PCI endpoint I/F unit 301a of the device apparatus 300a receives setting of negotiation information from the host apparatus 200a in negotiation in Gen1. The device arithmetic unit 305a of the device apparatus 300a saves to the device storage unit 306a the negotiation information in Gen1 (negotiation information for Gen1) that has been set (S1031a).

Once the setting of the negotiation information is completed in Gen1, the PCI endpoint I/F unit 301a carries out switching (speed change) of host-side communication to Gen2 via a recovery state for recovery from transient malfunction in the link (S1050).

In subsequent negotiation in Gen2, similarly, the device apparatus 300a receives setting of negotiation information in Gen2 (negotiation information for Gen2) and saves the negotiation information in Gen2 (S1081a).

When receiving a radio communication switching trigger from the MAC unit 302 upon occurrence of communication switching, the PCI endpoint I/F unit 301a carries out switching (speed change) of the host-side communication to Gen1 via the recovery state (S1130).

Then the device arithmetic unit 305a of the device apparatus 300a reads out the negotiation information in Gen1 saved to the device storage unit 306a and makes the PCI endpoint I/F unit 301a use the negotiation information in Gen1 (S1151a). That is, the data transfer system 100a carries out the switching from the fast mode to the slow mode without carrying out the negotiation in Gen1 in the communication switching.

<Configurations of Apparatuses>

Figure 11:
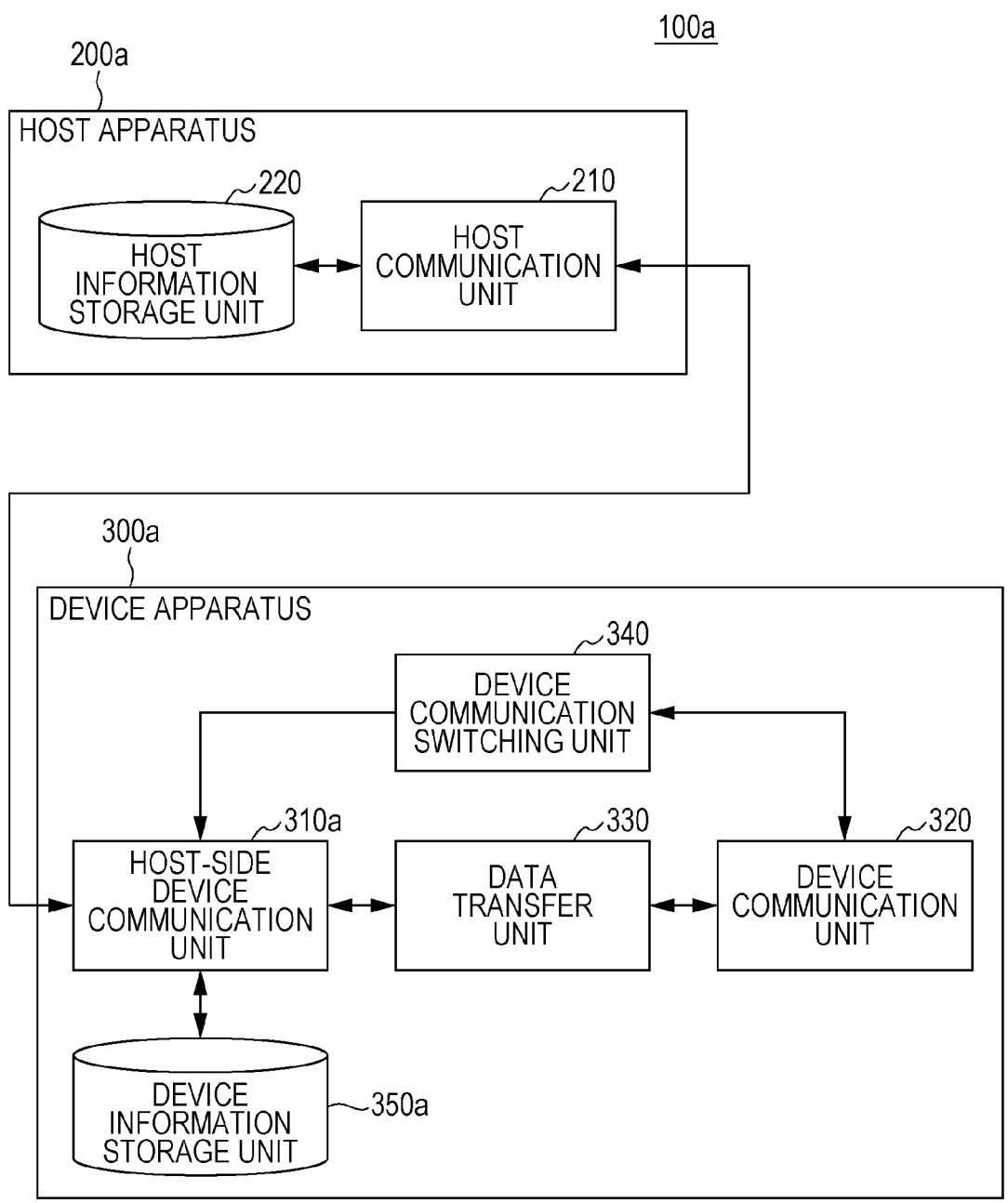
FIG. 11 illustrates an example of functional configurations of apparatuses according to embodiment 2.

FIG. 11 illustrates an example of configurations of the apparatuses and corresponds to FIG. 4 of embodiment 1. Components corresponding to those in FIG. 4 are designated by the same reference numerals and description thereon is appropriately omitted.

As illustrated in FIG. 11, the device apparatus 300a includes a host-side device communication unit 310a in place of the host-side device communication unit 310 of FIG. 4 and further includes a device information storage unit 350a. The device information storage unit 350a is connected to the host-side device communication unit 310a.

The host-side device communication unit 310a supports Gen2 (first communication mode) and Gen1 (second communication mode) and communicates with the host communication unit 210. When receiving the setting of the negotiation information for Gen1 from the host apparatus 200a, the host-side device communication unit 310a stores the negotiation information that has been set, in the device information storage unit 350a.

The device information storage unit 350a holds the negotiation information for Gen1 stored under instructions from the host-side device communication unit 310a.

The host-side device communication unit 310a corresponds to hardware relating to the PCI endpoint I/F unit 301a, the device arithmetic unit 305a, and the device storage unit 306a of FIG. 8, for instance. In this configuration, operations of the host-side device communication unit 310a are attained by execution of control programs by CPU, for instance. The device information storage unit 350a corresponds to hardware relating to the device storage unit 306a of FIG. 8, for instance.

<Operations of Device Apparatus>

Figure 12:
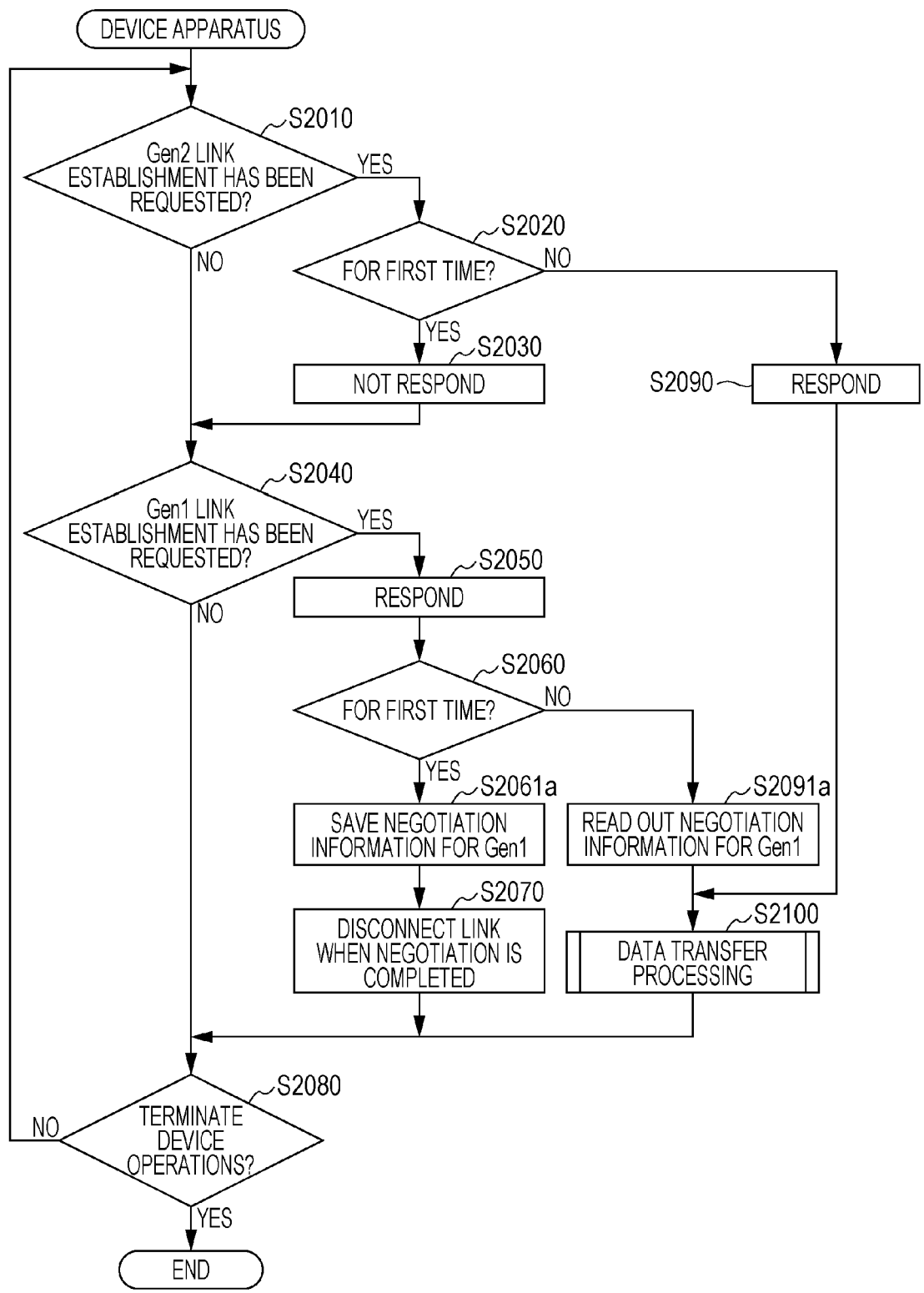
FIG. 12 illustrates an example of operations of a device apparatus according to embodiment 2.

FIG. 12 illustrates an example of the operations of the device apparatus 300a and corresponds to FIG. 5 of embodiment 1. Components corresponding to those in FIG. 5 are designated by the same step numbers and description thereon is omitted.

When Gen 1 link establishment is requested for first time from the host apparatus 200a (S2060: YES), as illustrated in FIG. 12, the host-side device communication unit 310a advances the processing through step S2061a to step S2070. When second or later request of the Gen 1 link establishment is issued from the host apparatus 200a (S2060: NO), the host-side device communication unit 310a advances the processing through step S2091a to step S2100.

In step S2061a, the host-side device communication unit 310a saves the negotiation information that has been set by the host apparatus 200a in the negotiation in Gen1, in the device information storage unit 350a.

In step S2091a, the host-side device communication unit 310a reads out the negotiation information for Gen1 saved to the device information storage unit 350a and switches the host-side communication to Gen1 without carrying out the negotiation.

The host-side device communication unit 310a may reuse the negotiation information, acquired in the past, without carrying out the negotiation for establishment of Gen2 link, as is the case with Gen1, though illustration and description are omitted. That is, the host-side device communication unit 310a may carry out processing similar to steps S2060, S2061a, and S2091a of FIG. 12, after processing in step S2090.

Through such configurations and operations as described above, the data transfer system 100a is capable of saving and reusing the negotiation information in the device apparatus 300a as well. That is, the data transfer system 100a according to the embodiment is capable of promptly switching the communication mode in the host-side communication when the communication switching in the network-side communication is carried out in the data transfer system 100a including the PCI express host interface.

As a result, the data transfer system 100a according to the embodiment is capable of reducing the power consumption resulting from the data transfer while maintaining functional values of the host apparatus 200a in a broader range of applications as to PCI Express.

<Modification of the Embodiment>

Technology described above may be applied to data transfer systems which include a device apparatus that carries out data transfer between two communication units each supporting a plurality of communication modes and in which both a host apparatus and a device apparatus make use of negotiation information.

The technology described above may be applied to data transfer systems which include a device apparatus that carries out data transfer between two communication units each supporting a plurality of communication modes and in which the device apparatus makes use of negotiation information.

The data transfer apparatus according to the disclosure includes the host-side device communication unit that supports the plurality of host-side communication modes including a first host-side communication mode and a second host-side communication mode, and that communicates with the host apparatus, the device communication unit that supports the plurality of network-side communication modes including a first network-side communication mode and a second network-side communication mode, the plurality of network-side communication modes respectively matching communication speeds of the plurality of host-side communication modes and that communicates with a communication device, the data transfer unit that carries out data transfer between the host-side device communication unit and the device communication unit, and the device communication switching unit that switches the first host-side communication mode to the second host-side communication mode, in response to the switching of the first network-side communication mode to the second network-side communication mode.

In the data transfer terminal, the device communication switching unit may switch the first network-side communication mode to the second network-side communication mode, in response to communication state between the communication device and the device communication unit.

In the data transfer apparatus, the host-side device communication unit may carry out the negotiation for the second host-side communication mode before starting the communication in the first host-side communication mode.

In the data transfer apparatus, the host apparatus may try the negotiation for the first host-side communication mode and the negotiation for the second host-side communication mode in order, and the host-side device communication unit may conceal from the host apparatus that the host-side device communication unit supports the first host-side communication mode, until the negotiation for the second host-side communication mode is carried out.

The data transfer apparatus may further include the device information storage unit that stores the negotiation information for the second host-side communication mode which is acquired by the host-side device communication unit, and the host-side device communication unit may use the negotiation information stored in the device information storage unit without carrying out the negotiation for the second host-side communication mode when the first host-side communication mode is switched to the second host-side communication mode.

In the data transfer apparatus, the first host-side communication mode may be higher in the data transfer rate than the second host-side communication mode.

In the data transfer apparatus, the first network-side communication modes may be WiGig, the second network-side communication mode may be WiFi, the first host-side communication mode may be USB 3.0, and the second host-side communication mode may be USB 2.0.

In the data transfer apparatus, the first network-side communication modes may be WiGig, the second network-side communication mode may be WiFi, the first host-side communication mode may be Gen2 of PCI Express, and the second host-side communication mode may be Gent of PCI Express.

The host apparatus of the disclosure is a host apparatus that communicates with the data transfer apparatus, the host apparatus includes the host communication unit that supports the first host-side communication mode and the second host-side communication mode and that communicates with the host-side device communication unit and the host information storage unit that stores the negotiation information for the second host-side communication mode which is acquired by the host communication unit, and the host communication unit carries out the negotiation for the second host-side communication mode before starting the communication in the first host-side communication mode and uses the negotiation information stored in the host information storage unit without carrying out the negotiation for the second host-side communication mode when the first host-side communication mode is switched to the second host-side communication mode.

In the host apparatus, the data transfer apparatus may try the negotiation for the first host-side communication mode and the negotiation for the second host-side communication mode in order, and the host communication unit may conceal from the data transfer apparatus that the host communication unit supports the first host-side communication mode, until the negotiation for the second host-side communication mode is carried out.

In the host apparatus, the first host-side communication mode may be higher in the data transfer rate than the second host-side communication mode.

The data transfer system of the disclosure includes the data transfer apparatus and the host apparatus.

The communication mode setting method of the disclosure in the data transfer apparatus that supports the plurality of host-side communication modes in communicating with the host apparatus, that supports the plurality of network-side communication modes in communicating with the communication devise, the plurality of network-side communication modes being respectively matching the communication speeds of the plurality of host-side communication modes, and that carries out data transfer between the host apparatus and the communication device, includes switching a network-side communication mode that is used to another of the plurality of network-side communication modes, and switching the host-side communication mode that is used to another of the plurality of host-side communication modes, in response to the switching of the network-side communication mode.

The disclosure is effective as a data transfer apparatus, a data transfer system, a communication mode setting method, and a host apparatus using the data transfer apparatus by which power consumption resulting from data transfer may be reduced in a broader range of application.

What is claimed is:

1. A data transfer apparatus comprising:
   a host-side communication device, which, in operation, supports a plurality of host-side communication modes having a plurality of host-side communication speeds, respectively, including a first host-side communication mode having a first host-side communication speed and a second host-side communication mode having a second host-side communication speed, and which in operation, communicates with a host apparatus using a host-side communication mode of the plurality of host-side communication modes;
   a network-side communication device, which, in operation, supports a plurality of network-side communication modes having a respective plurality of network-side communication speeds including a first network-side communication mode having a first network-side communication speed and a second network-side communication mode having a second network-side communication speed, the plurality of network-side communication speeds respectively corresponding to the plurality of host-side communication speeds, and which in operation, communicates with a communication device using a network-side communication mode of the plurality of network-side communication modes;
   a data transfer device, which, in operation, carries out data transfer between the host-side communication device and the network-side communication device; and
   a communication switching device, which, in operation, switches from communicating with the host apparatus using the first host-side communication mode to communicating using the second host-side communication mode, in response to communication with the communication device being switched from the first network-side communication mode to the second network-side communication mode such that communicating with the host apparatus is made using the second host-side communication speed that corresponds to the second network-side communication speed used in communicating with the communication device, wherein,
   the first host-side communication speed of the first host-side communication mode is higher in data transfer rate than the second host-side communication speed of the second host-side communication mode;
   the first network-side communication mode is WiGig, and the second network-side communication mode is WiFi; and
   the first host-side communication mode is USB 3.0, and the second host-side communication mode is USB 2.0.

2. The data transfer apparatus according to claim 1, wherein the communication switching device switches the first network-side communication mode to the second network-side communication mode in response to a change in a communication state between the communication device and the network-side communication device.

3. The data transfer apparatus according to claim 1, wherein the host-side communication device carries out negotiation for the second host-side communication mode before starting communication in the first host-side communication mode.

4. The data transfer apparatus according to claim 3,
wherein the host apparatus tries negotiation for the first host-side communication mode and the negotiation for the second host-side communication mode in order, and
wherein the host-side communication device conceals from the host apparatus that the host-side communication device supports the first host-side communication mode, until the negotiation for the second host-side communication mode is carried out.

5. The data transfer apparatus according to claim 3, further comprising:
an information storage device, which, in operation, stores negotiation information for the second host-side communication mode which is acquired by the host-side communication device,
wherein the host-side communication device uses the negotiation information stored in the information storage device without carrying out the negotiation for the second host-side communication mode when the first host-side communication mode is switched to the second host-side communication mode.

6. A host apparatus that communicates with a data transfer apparatus, the host apparatus comprising:
a host communication device, which, in operation, supports a plurality of host-side communication modes having a plurality of host-side communication speeds, respectively, including a first host-side communication mode having a first host-side communication speed and a second host-side communication mode having a second host-side communication speed, and which, in operation, communicates with the data transfer apparatus using a host-side communication mode of the plurality of host-side communication modes; and
a host information storage device, which, in operation, stores negotiation information for the second host-side communication mode which is acquired by the host communication device,
wherein:
the data transfer apparatus, in operation, supports a plurality of network-side communication modes having a respective plurality of network-side communication speeds including a first network-side communication mode having a first network-side communication speed and a second network-side communication mode having a second network-side communication speed, communicates with a communication device using a network-side communication mode of the plurality of network-side communication modes, and carries out data transfer between the host apparatus and the communication device, the plurality of network-side communication speeds respectively corresponding to the plurality of host-side communication speeds;
the host communication device carries out negotiation for the second host-side communication mode before starting communication in the first host-side communication mode, and uses the negotiation information stored in the host information storage device without carrying out the negotiation for the second host-side communication mode when communication with the data transfer apparatus using the first host-side communication mode is switched to communication using the second host-side communication mode, in response to communication with the communication device being switched from the first network-side communication mode to the second network-side communication mode such that communicating with the data transfer apparatus is made using the second host-side communication speed that corresponds to the second network-side communication speed used in communicating with the communication device;
the first host-side communication speed of the first host-side communication mode is higher in data transfer rate than the second host-side communication speed of the second host-side communication mode;
the first network-side communication mode is WiGig, and the second network-side communication mode is WiFi; and
the first host-side communication mode is USB 3.0, and the second host-side communication mode is USB 2.0.

7. The host apparatus according to claim 6, wherein:
the data transfer apparatus tries negotiation for the first host-side communication mode and the negotiation for the second host-side communication mode in order, and
the host communication device conceals from the data transfer apparatus that the host communication device supports the first host-side communication mode, until the negotiation for the second host-side communication mode is carried out.

8. A data transfer system comprising:
a data transfer apparatus; and
a host apparatus that communicates with the data transfer apparatus,
wherein the data transfer apparatus comprises:
a host-side communication device, which, in operation, supports a plurality of host-side communication modes having a plurality of host-side communication speeds, respectively, including a first host-side communication mode having a first host-side communication speed and a second host-side communication mode having a second host-side communication speed, and which in operation, communicates with a host apparatus using a host-side communication mode of the plurality of host-side communication modes;
a network-side communication device, which, in operation, supports a plurality of network-side communication modes having a respective plurality of network-side communication speeds including a first network-side communication mode having a first network-side communication speed and a second network-side communication mode having a second network-side communication speed, the plurality of network-side communication speeds respectively corresponding to the plurality of host-side communication speeds, and which in operation, communicates with a communication device using a network-side communication mode of the plurality of network-side communication modes;
a data transfer device, which, in operation, carries out data transfer between the host-side communication device and the network-side communication device; and
a communication switching device, which, in operation, switches from communicating with the host apparatus using the first host-side communication mode to communicating using the second host-side communication mode, in response to communication with the communication device being switched from the first network-side communication mode to the second network-side communication mode such that communicating with the host apparatus is made using the second host-side communication speed that corresponds to the second network-side communication speed used in communicating with the communication device, wherein the host apparatus comprises:
a host communication device, which, in operation, supports the first host-side communication mode and the second host-side communication mode, and which, in operation, communicates with the host-side communication device; and
a host information storage device, which, in operation, stores negotiation information for the second host-side communication mode which is acquired by the host communication device, wherein,
the host communication device carries out negotiation for the second host-side communication mode before starting communication in the first host-side communication mode, and uses the negotiation information stored in the host information storage device without carrying out the negotiation for the second host-side communication mode when the first host-side communication mode is switched to the second host-side communication mode;
the first host-side communication speed of the first host-side communication mode is higher in data transfer rate than the second host-side communication speed of the second host-side communication mode;
the first network-side communication mode is WiGig, and the second network-side communication mode is WiFi; and
the first host-side communication mode is USB 3.0, and the second host-side communication mode is USB 2.0.

9. A communication mode setting method in a data transfer apparatus that supports a plurality of host-side communication modes having a plurality of host-side communication speeds, respectively, in communicating with a host apparatus, that supports a plurality of network-side communication modes having a respective plurality of network-side communication speeds in communicating with a communication device, the plurality of network-side communication speeds respectively corresponding to the plurality of host-side communication speeds, and that carries out data transfer between the host apparatus and the communication device, the method comprising:
switching a network-side communication mode that is currently being used to another of the plurality of network-side communication modes; and
switching a host-side communication mode that is used to another of the plurality of host-side communication modes, in response to the switching the network-side communication mode such that communicating with the host apparatus is made using a host-side communication speed that corresponds to a network-side communication speed used in communicating with the communication device, wherein,
the host-side communication speed of the host-side communication mode is higher in data transfer rate than the host-side communication speed of the another of the host-side communication modes; the network-side communication mode is WiGig, and the another of the network-side communication modes is WiFi; and
the host-side communication mode is USB 3.0, and the another of the host-side communication modes is USB 2.0.

10. The method according to claim 9, wherein the switching the network-side communication mode that is currently being used to the another of the network-side communication modes occurs in response to a change in a communication state between the communication device and a network-side communication device.

11. The method according to claim 9, further comprising carrying out negotiation for the another of the host-side communication modes before starting communication in the host-side communication mode.

12. The method according to claim 11, further comprising:
negotiating for the host-side communication mode and negotiating for the another of host-side communication modes in order, and
concealing the host-side communication mode from the host apparatus until the negotiation for the another of the host-side communication modes is carried out.

13. The method according to claim 11, further comprising:
storing negotiation information for the another of the host-side communication modes, and
using the negotiation information without carrying out the negotiation for the another of the host-side communication modes when the host-side communication mode is switched to the another of the host-side communication modes.

* * * * *